No. 875,247. PATENTED DEC. 31, 1907.
J. DIERDORFF & W. W. WILLSON.
CONVEYER CHAIN.
APPLICATION FILED APR. 7, 1906.
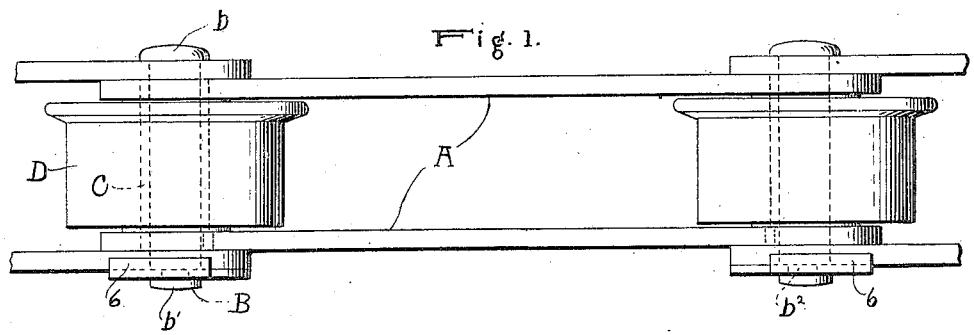
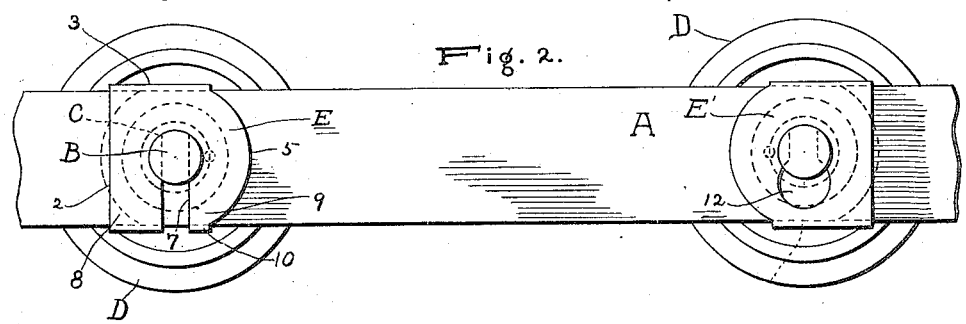
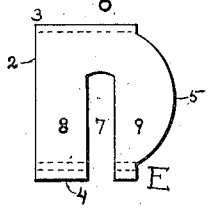 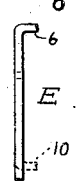 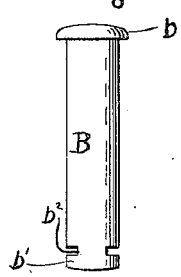 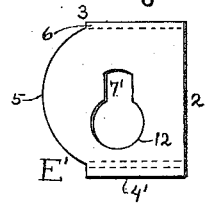
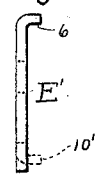
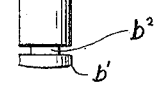
Witnesses
Stuart Hilder.
N. Curtis Lammond
Inventors
Joseph Dierdorff and
William W. Willson
H. K. Bliss
Their Attorney

UNITED STATES PATENT OFFICE.

JOSEPH DIERDORFF AND WILLIAM W. WILLSON, OF COLUMBUS, OHIO, ASSIGNORS, BY MESNE ASSIGNMENTS, TO THE JEFFREY MANUFACTURING COMPANY, A CORPORATION OF OHIO.

CONVEYER-CHAIN.

No. 875,247.　　　　Specification of Letters Patent.　　　　Patented Dec. 31, 1907.

Application filed April 7, 1906. Serial No. 310,508.

*To all whom it may concern:*

Be it known that we, JOSEPH DIERDORFF and WILLIAM W. WILLSON, citizens of the United States, residing at Columbus, in the county of Franklin and State of Ohio, have invented certain new and useful Improvements in Conveyer-Chains, of which the following is a specification, reference being had therein to the accompanying drawing.

In the use of drive and conveyer chains of the type wherein the links are formed of a series of separate side bars connected by pintles, which latter often serve as the supports or axles for wheels or rollers, much difficulty has been experienced in securing a satisfactory means for holding the pintles in place and preventing them from moving longitudinally or out of their seats.

Our invention has for its object to produce a locking means for holding the pintles in place, and it consists of a washer that may be easily applied to the projecting end of a pintle for the purpose stated.

In the accompanying drawings Figure 1 is a plan view of a short section of a conveyer chain provided with our invention. Fig. 2 is a side or edge view of the parts shown in Fig. 1. Figs. 3 and 4 show two different styles of pintles that may be used in connection with our improvements. Fig. 5 is a face view of one form of washer embodying our invention. Fig. 6 is an edge view of the same. Fig. 7 is a face view of another embodiment of our invention, and Fig. 8 is an edge view of the washer shown in Fig. 7.

In the drawings, A refers to the side bars of the chain, B the connecting pintles, C wearing sleeves or bushings mounted upon the pintles, and D wheels or rollers arranged between the side bars at the joints of the chain and supported upon the wearing sleeves. These parts may be of any common or well-known construction. Each pintle is preferably provided at one end with an enlarged head $b$ and is of a length to extend entirely across the chain, so that when the head is in engagement with the outer face of a link on one side, its opposite end projects a little beyond the outer face of the other side bar. Near the end of the pintle opposite the head $b$ is formed a neck or stem $b^2$ of reduced size, which may be produced by slotting or cutting away the pintle on opposite sides, as indicated in Fig. 3, or by forming a circumferential groove, as represented in Fig. 4.

E designates, as a whole, the locking plate or washer, of which there is one for each pintle. The form of the locking washer represented in Figs. 5 and 6 and at the left-hand ends of Figs. 1 and 2, will first be described. It is formed of thin metal, and its up and down dimensions are slightly greater than the width of a side bar A. Preferably its inner edge, 2, is straight and disposed at right angles to the straight top and bottom edges 3, 4, while the outer edge, 5, is curved to conform to the end of the side bar against which the washer rests when in use. The upper edge is turned over to constitute an inward extending flange 6 that is adapted to rest upon the upper edge of the side bar, this flange being preferably produced when the washer is made. 7 represents a slot formed in the central portion of the washer and extending upward from the lower edge 4, so that it divides the lower portion of the washer, forming two legs, 8, 9, that are adapted to straddle the neck of the pintle, as clearly indicated in Fig. 2, the width of the slot being substantially equal to the diameter of the neck. The washer is applied by slipping it, preferably from above, over the reduced part or neck of the pintle until the flange 6 comes into engagement with the edge of the side bar, after which the lower portions of the legs 8, 9, which then extend beyond the lower edge of the side bar, are bent inward, as indicated at 10, forming flanges that engage with the under edge of the side bar, and in coöperation with the flange 6 serve to hold the washer securely in position. The head or portion $b'$ of the pintle beyond the neck $b^2$ serves to prevent outward movement of the washer.

The form of our invention represented in Fig. 7, and at the right hand ends of Figs. 1 and 2 is quite similar to that just described. The washer here represented is designated as E' and has a rear or inner straight edge 2, an outer edge 5, an upper straight edge 3, a lower straight edge 4', and a flange 6. It is centrally slotted so as to engage with the neck of a pintle, but the slot, 7', does not extend, as in the construction already described, to the lower edge 4', but instead terminates in a circular enlargement 12 of a size that will permit the end $b'$ of the pintle to freely pass therethrough. This washer is applied by slipping it over the end of a pintle, which passes through the enlargement 12 of the aperture therein, until the slot portion 7' comes opposite to the neck $b^2$, when the washer is moved cross-wise of the pintle, bringing the parts into the positions represented in Fig. 2. The flange 6 then rests against one edge of the side bar, and the edge 4' extends beyond the opposite edge thereof and may be bent inward, by a hammer or other suitable tool, to form a flange 10', similar to the flanges 10 of the washer already described.
A lock device such as we have described is of simple construction, is easily applied, and when once in place constitutes a secure means for holding the pintle in place. Should it become necessary to uncouple the chain or for any other reason to remove one of the pintles, the washer for that pintle can be taken off after first straightening out one of the flanged edges to allow it to be slipped off the neck of the pintle.
What we claim is:

1. The combination with the side bars and connecting pintles of a chain, the pintles being formed with reduced necks, of locking or securing washers, each slotted to engage with the neck of a pintle and formed along its opposite edges with flanges arranged to engage with the opposite edges of a side bar of the chain and prevent movement of the washer relative to the pintle, substantially as set forth.

2. The combination with a chain having side bars and connecting pintles, the pintles being formed with reduced necks, of washers for locking the pintles in place, each slotted to engage with the neck of a pintle and having along one edge a flange adapted to engage with the upper edge of a side bar of the chain, the opposite edge of the washer extending beyond the lower edge of the side bar and being arranged to be bent inward to be engaged therewith, substantially as set forth.

3. The combination with a chain having side bars and connecting pintles, the pintles being formed with reduced necks, of washers for locking the pintles in place, each washer being formed with a flange 6 along one edge and with a centrally disposed slot 7 adapted to engage with the neck of a pintle and serve to divide the washer to form two legs, 8, 9, the lower ends of which are arranged to be bent to form flanges 10, substantially as set forth.

4. A locking washer for holding in place a connecting pintle of a conveyer or drive chain, consisting of a plate having a straight rear edge 2 and a front edge 5 shaped to conform with the end of a side bar of a chain link, the upper edge of the plate being provided with an in-turned flange and the lower edge extending beyond the lower edge of the said side bar to permit of its being bent inward under the lower edge thereof, and the plate being formed with a slot extending in a direction at right angles to the said upper and lower edges and arranged to engage with the pintle which the washer is to hold in position, substantially as shown.

In testimony whereof we affix our signatures, in presence of two witnesses.

JOSEPH DIERDORFF.
WILLIAM W. WILLSON.

Witnesses:
F. R. WILLSON, Jr.,
CHAS. M. SNIDER.